United States Patent
Ishikawa

(10) Patent No.: US 12,452,547 B2
(45) Date of Patent: Oct. 21, 2025

(54) INFORMATION PROCESSING APPARATUS, INFORMATION PROCESSING METHOD, AND PROGRAM

(71) Applicant: JIG-SAW INC., Tokyo (JP)

(72) Inventor: Toshiro Ishikawa, Tokyo (JP)

(73) Assignee: JIG-SAW INC., Tokyo (JP)

( * ) Notice: Subject to any disclaimer, the term of this patent is extended or adjusted under 35 U.S.C. 154(b) by 256 days.

(21) Appl. No.: 18/128,831

(22) Filed: Mar. 30, 2023

(65) Prior Publication Data

US 2023/0345132 A1    Oct. 26, 2023

(30) Foreign Application Priority Data

Apr. 26, 2022  (JP) ................................ 2022-072261

(51) Int. Cl.
| | |
|---|---|
| *H04N 23/76* | (2023.01) |
| *H04N 23/67* | (2023.01) |
| *H04N 23/71* | (2023.01) |
| *H04N 23/741* | (2023.01) |
| *H04N 23/84* | (2023.01) |

(52) U.S. Cl.
CPC .......... *H04N 23/76* (2023.01); *H04N 23/673* (2023.01); *H04N 23/71* (2023.01); *H04N 23/741* (2023.01); *H04N 23/84* (2023.01)

(58) Field of Classification Search
CPC ...... H04N 23/76; H04N 23/673; H04N 23/71; H04N 23/741; H04N 23/84; H04N 9/68
See application file for complete search history.

(56) References Cited

U.S. PATENT DOCUMENTS

| | | |
|---|---|---|
| 5,296,920 A | 3/1994 | Sakaue et al. |
| 5,661,575 A | 8/1997 | Yamashita et al. |
| 2005/0052566 A1* | 3/2005 | Kato .................. G02B 7/32 |
| | | 348/370 |

(Continued)

FOREIGN PATENT DOCUMENTS

| | | |
|---|---|---|
| JP | H04-150171 A | 5/1992 |
| JP | H05-076036 A | 3/1993 |
| JP | H06-090382 A | 3/1994 |

(Continued)

OTHER PUBLICATIONS

Jobson, D. J., et al., "Properties and Performance of a Center/Surround Retinex", IEEE Transactions on Image Processing, vol. 6, No. 3, pp. 451-462 (Mar. 1997).

(Continued)

*Primary Examiner* — Christopher K Peterson
(74) *Attorney, Agent, or Firm* — SHOOK, HARDY & BACON L.L.P.

(57) ABSTRACT

An information processing apparatus including a first processing unit configured to define an entirety indicated by multiple pixels as a single image, and identify a first histogram that is a histogram of brightness in the image; a second processing unit configured to set an adjustment amount in the first histogram; and a third processing unit configured to subtract, from the first histogram, a portion near a peak of the first histogram, based on the adjustment amount, and shift a histogram corresponding to the portion to an area of the first histogram at which the peak is at least relatively low to generate a second histogram.

20 Claims, 11 Drawing Sheets

(56) References Cited

U.S. PATENT DOCUMENTS

2010/0073395 A1\* 3/2010 Kato ................ H04N 23/76
  345/589
2021/0243352 A1\* 8/2021 McElvain ............. H04N 23/72

FOREIGN PATENT DOCUMENTS

| JP | 2001069525 A  | 3/2001  |
|----|---------------|---------|
| JP | 2005176171 A  | 6/2005  |
| JP | 2008048188 A  | 2/2008  |
| JP | 2010-074858 A | 4/2010  |
| JP | 2012108898 A  | 6/2012  |
| JP | 2018-026794 A | 2/2018  |
| JP | 2019-207603 A | 12/2019 |
| JP | 2022-049404 A | 3/2022  |

OTHER PUBLICATIONS

Notice of Reasons for Rejection received for Japanese Patent Application No. 2022-072261, mailed on Jun. 13, 2023, 11 pages. (English Translation Submitted).

Decision of Rejection re Application No. 2022-072261 Mailed Oct. 17, 2023, 2 Pages.

\* cited by examiner

FIRST HISTOGRAM Y

SECOND HISTOGRAM Y1

FIG. 4

| DATA # | INPUT DATA (IMAGE DATA) | OUTPUT DATA | | |
|---|---|---|---|---|
| | | CLIP VALUE | NUMBER OF REPETITIONS OF PROCESS | IMAGE DATA |
| #1 | DATA 1a | VALUE 1 | 1 TIME | DATA 1b |
| #2 | DATA 2a | VALUE 2 | 2 TIME | DATA 2b |
| #3 | DATA 3a | VALUE 3 | 3 TIME | DATA 3b |
| ... | ... | ... | ... | ... |
| #9998 | DATA 9998a | VALUE 9998 | 9998 TIME | DATA 9998b |
| #9999 | DATA 9999a | VALUE 9999 | 9999 TIME | DATA 9999b |
| #10000 | DATA 10000a | VALUE 10000 | 10000 TIME | DATA 10000b |

FIG. 5

| DATA # | INPUT DATA (IMAGE DATA AND/OR FIRST HISTOGRAM) | OUTPUT DATA | | |
|---|---|---|---|---|
| | | CLIP VALUE | NUMBER OF REPETITIONS OF PROCESS | IMAGE DATA AND/OR SECOND HISTOGRAM |
| #1 | DATA 1a | VALUE 1 | 1 TIME | DATA 1b |
| #2 | DATA 2a | VALUE 2 | 2 TIME | DATA 2b |
| #3 | DATA 3a | VALUE 3 | 3 TIME | DATA 3b |
| ... | ... | ... | ... | ... |
| #9998 | DATA 9998a | VALUE 9998 | 9998 TIME | DATA 9998b |
| #9999 | DATA 9999a | VALUE 9999 | 9999 TIME | DATA 9999b |
| #10000 | DATA 10000a | VALUE 10000 | 10000 TIME | DATA 10000b |

INFORMATION PROCESSING APPARATUS, INFORMATION PROCESSING METHOD, AND PROGRAM

CROSS REFERENCE TO RELATED APPLICATION

Priority is claimed on Japanese Patent Application No. 2022-072261, filed Apr. 26, 2022, the content of which is incorporated herein by reference.

BACKGROUND OF THE INVENTION

Field of the Invention

The present disclosure relates to an information processing apparatus, an information processing method, and a program.

Description of Related Art

Due to the spread of the internet and the like, moving images are often being captured. Patent Document 1 (JP 2001-069525 A) and Patent Document 2 (JP 2008-048188 A) disclose, as associated technologies, technologies relating to video processing.

SUMMARY OF THE INVENTION

The respective embodiments disclosed herein have, as examples of the objectives thereof, to provide an information processing apparatus, an information processing method, and a program that can solve the problem.

According to an example of an aspect of an embodiment disclosed herein, in order to achieve the above-mentioned purpose, an information processing apparatus includes a first processing unit configured to define an entirety indicated by multiple pixels as a single image, and identify a first histogram that is a histogram of brightness in the image; a second processing unit configured to set an adjustment amount in the first histogram; and a third processing unit configured to subtract, from the first histogram, a portion near a peak of the first histogram, based on the adjustment amount, and shift a histogram corresponding to the portion to an area of the first histogram at which values are at least relatively low to generate a second histogram.

According to an example of another aspect of an embodiment disclosed herein, in order to achieve the above-mentioned purpose, an information processing method includes defining an entirety indicated by multiple pixels as a single image, and identifying a first histogram that is a histogram of brightness in the image; setting an adjustment amount in the first histogram; and subtracting, from the first histogram, a portion near a peak of the first histogram, based on the adjustment amount, and shifting a histogram corresponding to the portion to an area of the first histogram at which values are at least relatively low to generate a second histogram.

According to an example of another aspect of an embodiment disclosed herein, in order to achieve the above-mentioned purpose, a non-transitory computer-readable storage medium storing a program that causes a computer to execute processes, the processes include: defining an entirety indicated by multiple pixels as a single image, and identifying a first histogram that is a histogram of brightness in the image; setting an adjustment amount in the first histogram; and subtracting, from the first histogram, a portion near a peak of the first histogram, based on the adjustment amount, and shifting a histogram corresponding to the portion to an area of the first histogram at which values are at least relatively low to generate a second histogram.

BRIEF DESCRIPTION OF THE DRAWINGS

FIG. 4 is a diagram indicating an example of teacher data.

FIG. 5 is a diagram indicating an example of teacher data different from FIG. 4.

DETAILED DESCRIPTION OF THE INVENTION

Hereinafter, embodiments will be explained in detail with reference to the drawings.

Embodiments

Configuration of Information Processing System

Figure 1:
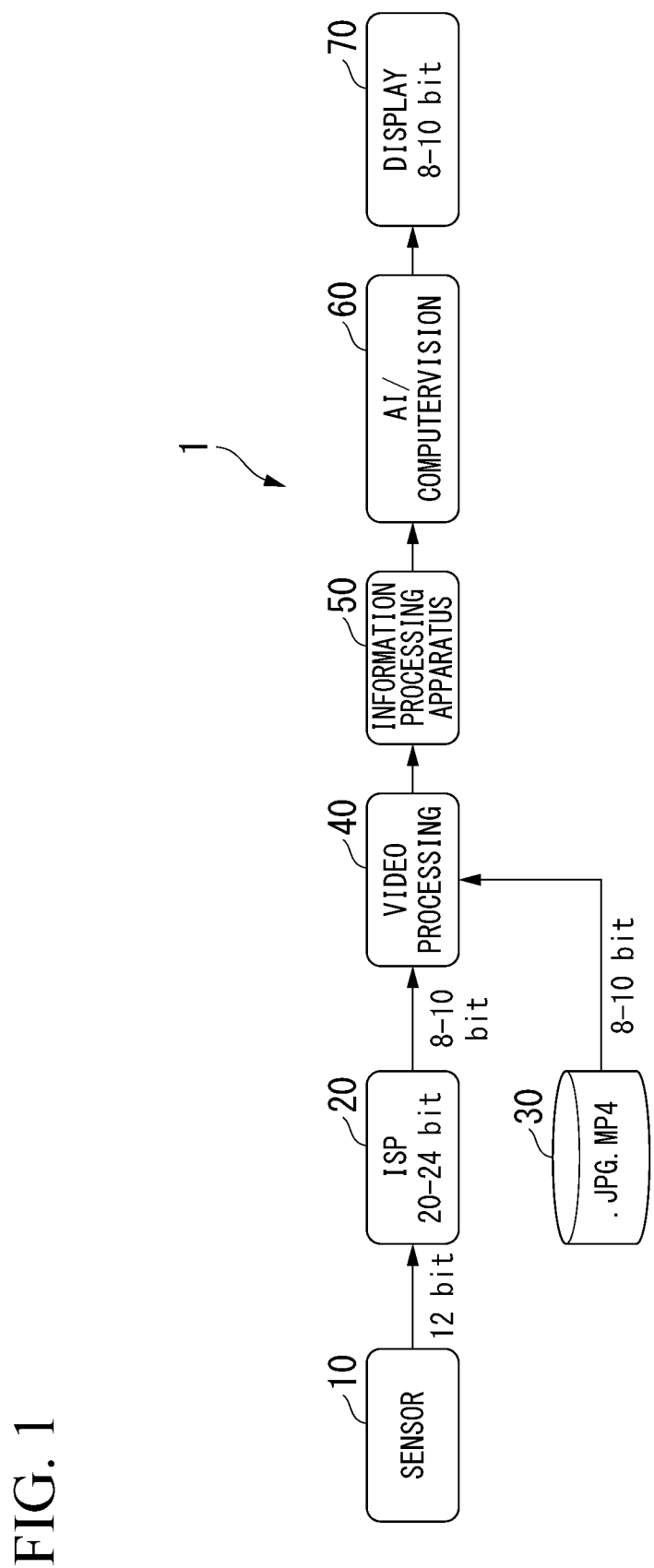
FIG. 1 is a diagram depicting an example of the configuration of an information processing system according to an embodiment disclosed herein.

FIG. 1 is a diagram depicting an example of the configuration of an information processing system 1 according to an embodiment disclosed herein.

As depicted in FIG. 1, the information processing system 1 comprises a sensor 10, an ISP (Image Signal Processor) 20, a storage apparatus 30, a video processing apparatus 40, an information processing apparatus 50, an AI (Artificial Intelligence)/CV (Computer Vision) 60, and a display 70.

The sensor 10 acquires video images by converting light signals to electrical signals. Examples of the sensor 10 include image sensors such as CMOS (Complementary Metal Oxide Semiconductor) sensors and CCD (Charge Coupled Device) sensors.

The ISP 20 performs signal processing on the electrical signals after they have been converted by the sensor 10. Examples of the signal processing include a black level adjustment process, an HDR (High Dynamic Range) process, a gain/exposure adjustment process, a defect correction process, a shading correction process, a gamma correction process, a sharpness process, and the like.

The black level adjustment process will be explained. When the sensor 10 is, for example, a sensor that can represent data in 12 bits per pixel, the pixel value of each pixel is represented by a 4096-step quantization level (0 to 4095). This quantization level represents the brightness, and the black level serves as a reference for the brightness. The ISP 20 implements the black level adjustment process by adjusting the reference for brightness so that the black level remains the same even if the environment has changed.

The HDR process will be explained. An HDR process is a process for widening the dynamic range. The dynamic range is an indicator representing the tolerance range of the brightness difference between black and white in an image. The ISP 20 combines two or more images captured with different exposure times, thereby realizing a dynamic range wider than the dynamic range that can be realized by a single exposure time.

The gain/exposure adjustment process will be explained. A gain/exposure adjustment process is a process for adjusting the light captured by the sensor 10. For example, the ISP 20 adjusts the light captured by the sensor 10 by adjusting the exposure time of the sensor 10. Additionally, for example, in the case in which too little light is captured by the sensor 10, the ISP 20 raises the gain and amplifies the charge stored in the sensor 10, thereby making an adjustment as if a large amount of charge is stored. As a result thereof, even if the exposure time is short, effects similar to those in the case in which light has been captured can be obtained.

The defect correction process will be explained. A defect correction process is a process for correcting defects in pixels. The sensor 10 has a defective pixel among the pixels, which emits red, blue, or green light even when the screen is made completely black. In such cases, for example, the coordinates at which the pixels are defective are stored in memory, and the ISP 20 makes corrections by interpolation using the pixels surrounding those coordinates. Additionally, for example, the ISP 20 identifies the coordinates at which defects are located in images captured in real time, and executes defect correction on the identified coordinate by interpolation using the surrounding pixels.

The shading correction process will be explained. Shading refers to the ratio between the amount of light at the center of a screen and the amount of light at the periphery of a screen. A shading correction process is a process for reducing this ratio. For example, if the amount of light at the center of a screen is large and the amount of light decreases towards the periphery of the screen, then the ISP 20 executes shading correction by adjusting the gain to become gradually higher towards the periphery of the screen than the gain at the center of the screen.

The gamma correction process will be explained. A gamma correction process is a process for changing the input/output brightness to make an image appear as if the contrast has changed. For example, the ISP 20 executes gamma correction by changing the brightness of the output relative to the brightness of the input based on a gamma curve, which is a curve determined by gamma values.

The sharpness process will be explained. A sharpness process is a process for enhancing edges. The ISP 20 identifies edges in a captured images and performs a process to enhance the edges.

The storage apparatus 30 stores image data and moving image data. Examples of image data include JPEG (Joint Photographic Experts Group) files and the like. Additionally, examples of moving image data include MP4 files, which were formulated as part of the MPEG-4 standard, and the like.

The video processing apparatus 40 processes video data output by the ISP 20, and the image data and the moving image data stored in the storage apparatus 30, at a bit depth (e.g., 8 to 10 bit) lower than the bit depth (e.g., 20 to 24 bit) in the ISP 20. The video processing apparatus 40 outputs the processed data to the information processing apparatus 50 in the form of RGB signals.

The information processing apparatus 50 performs signal processing on the RGB signals. The signal processing performed by the information processing apparatus 50 will be explained in detail below. The information processing apparatus 50 outputs the data that has undergone signal processing to the AI/CV 60. The information processing apparatus 50 is realized, for example, by a computer such as a personal computer.

The AI/CV 60 executes prescribed processes for extracting useful information from images by using AI technology. Examples of useful information include information relating to recognized faces, information relating to recognized objects, information relating to recognized lines of movement, and the like. Examples of prescribed processes include a process for recognizing faces, a process for recognizing objects, a process for recognizing lines of movement, and the like. The AI/CV 60 may perform processes for applications not using AI technology. The AI/CV 60 outputs data received from the information processing apparatus 50 to the display 70.

The display 70 displays data (i.e., data that has undergone signal processing by the information processing apparatus 50) output by the AI/CV 60.

(Configuration of Information Processing Apparatus)

Figure 2:
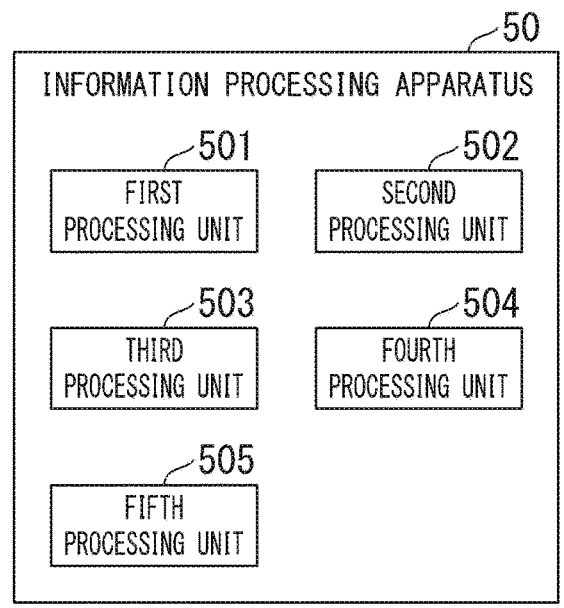
FIG. 2 is a diagram depicting an example of the configuration of an information processing apparatus according to an embodiment disclosed herein.

The information processing apparatus 50 will be explained. FIG. 2 is a diagram depicting an example of the configuration of an information processing apparatus 50 according to an embodiment disclosed herein. As depicted in FIG. 2, the information processing apparatus 50 comprises a first processing unit 501, a second processing unit 502, a third processing unit 503, a fourth processing unit 504, and a fifth processing unit 505. Hereinafter, a Y signal (an example of a first signal) will refer to a signal indicating the brightness Y. Additionally, an R signal (an example of a second signal) will refer to a signal associated with red (an example of a first color). Additionally, a B signal (an example of a third signal) will refer to a signal associated with blue (an example of a second color). Additionally, a G signal (an example of a fourth signal) will refer to a signal associated with green (an example of a third color). The information processing apparatus 50 performs signal processing on the Y signal, the R signal, and the B signal, or on the Y signal, the R signal, the B signal, and the G signal. The information processing apparatus 50 is an apparatus that can correct the dynamic range of video signals input to the display 70.

The first processing unit 501 converts an RGB signal to a Y signal, a color difference signal Xr, and a color difference signal Xb. The first processing unit 501 divides an image indicated by multiple pixels into M×N images (for example, dividing the image into 1×1 image so that the entirety is a single image), and identifies first histograms Y that are histograms of the brightness (i.e., the Y signal) in each image after the division.

The second processing unit 502 sets a clip value (an example of an adjustment amount) in the first histograms Y identified by the first processing unit 501. The clip value is an amount defining an amount by which a portion y near the peak of a first histogram Y is subtracted at once from the first histogram Y. This clip value may be a predetermined value. Additionally, this clip value may be decided by a user each time processing is performed.

The third processing unit 503 subtracts, from the first histogram Y, a portion y near the peak of the first histogram Y, based on the clip value. Furthermore, the third processing unit 503 shifts a histogram y1 corresponding to the subtracted portion y of the first histogram Y to an area of the first histogram Y at which values are at least relatively low. The area of the first histogram Y at which values are at least relatively low may include the area where the portion y near the peak of the first histogram Y is subtracted. An example of this process for moving the histogram y1 performed by the third processing unit is a CLAHE (Contrast-Limited Adaptive Histogram Equalizer) or the like. By repeating this process a required number of times, the third processing unit 503 generates a second histogram Y1 that is a brightness histogram.

Figure 3A:
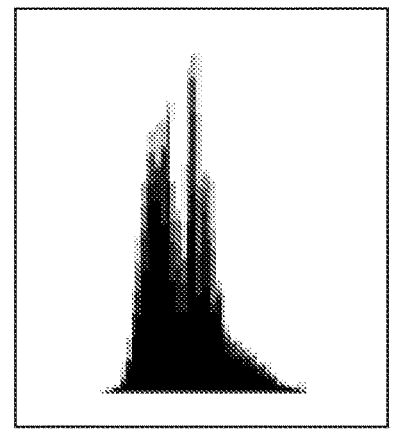
FIG. 3A is a first diagram for explaining an example of the processing in a third processing unit according to an embodiment disclosed herein.
Figure 3B:
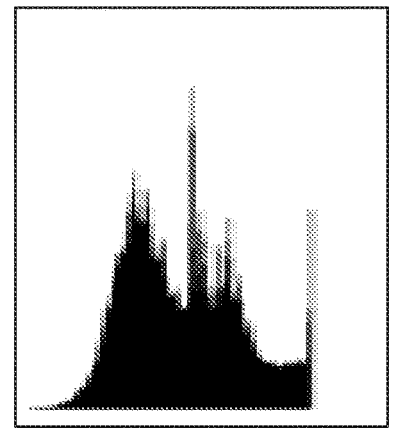
FIG. 3B is a second diagram for explaining an example of the processing in the third processing unit according to an embodiment disclosed herein.

FIG. 3A and FIG. 3B are diagrams depicting an example of the change in histograms due to the processing of the third processing unit 503 by the first embodiment disclosed herein. FIG. 3A indicates a first histogram Y identified by the first processing unit 501. Additionally, FIG. 3B indicates a second histogram Y1, which is a histogram of the brightness after the third processing unit 503 has shifted the histogram y1 corresponding to the portion y near the peak of the first histogram Y to an area of the first histogram Y at which the values are at least relatively low. The area of the first histogram Y at which the values are relatively low includes areas where the first histogram Y does not exist. As can be understood from FIG. 3B, the third processing unit 503 reduces the values of the first histogram Y near the peak and increases the values in an area of the histogram at which the values are at least relatively low. In other words, in the flattening process due to the third processing unit 503, the degree of flattening can be adjusted by the clip value and the number (i.e., the "required number of times" mentioned above) of repetitions of the process. In the case in which a general histogram flattening method in which the degree of flattening cannot be adjusted is used, there is a possibility that excessive flattening will occur, and a possibility that the image will become too white overall. However, in the third processing unit 503, such excessive flattening can be suppressed and the overall image can be prevented from becoming too white.

The number of repetitions of the process may be decided by a user checking the image each time the process is performed once, and stopping the process upon determining that a desired image has been obtained. Additionally, the number of repetitions of the process may be predetermined.

Additionally, the number of repetitions of the process may be determined by using AI technology in addition to a clip value. For example, the third processing unit 503 predicts the clip value and the number of repetitions of the process by using a learned model (for example, a convolutional neural network) for which parameters have been decided by using teacher data, which is a type of machine learning. The learned models used by the third processing unit 503 for each prediction will be explained.

(Learned Models)

The learned models will be explained. The third processing unit 503 predicts the number of repetitions of the process and the clip value based on image data before flattening a histogram and image data after flattening the histogram. A learned model for the case of predicting the number of repetitions of the process and the clip value based on image data before flattening a histogram and image data after flattening the histogram will be explained.

In this case, one of the inputs is image data before flattening. Additionally, the output data includes a clip value actually set for that image data, the number of repetitions of the process actually performed on that image data, and the image data after flattening the histogram obtained by actually performing the process on the image data. Furthermore, one type of teacher data is a combination of input data and output data corresponding to that input data. For example, before the number of repetitions of the process and the clip value are predicted by the third processing unit 503, output data (that is, a clip value actually set for image data before flattening, the number of repetitions of the process actually performed on that image data, and the image data after flattening the histogram obtained by actually performing the process on the image data) relating to input data used by another device to predict the number of repetitions of the process and the clip value, is identified. Additionally, for example, output data relating to the input data is identified by performing experiments, simulations or the like. Thus, teacher data comprising multiple sets of data combining input data and output data can be prepared. Teacher data refers to data used for determining the values of parameters in a learning model in which the parameter values are not determined.

FIG. 4 is a diagram indicating an example of teacher data. Input data, which is image data before flattening, and output data (i.e., the clip values actually set for image data before flattening, the number of repetitions of the process actually performed on that image data, and the image data after flattening the histogram obtained by actually performing the process on the image data) corresponding to that input data form one set of data. In the example indicated in FIG. 4, the teacher data includes 10000 sets of data.

For example, the case in which the teacher data comprising 10000 sets of data indicated in FIG. 4 is used to determine the parameters in a learning model will be considered. In this case, the teacher data is divided, for example, into training data, evaluation data and test data. Examples of the percentages of the training data, the evaluation data and the test data include "70%, 15% and 15%", "95%, 2.5% and 2.5%", etc. For example, suppose that the teacher data of data #1 to #10000 has been divided into data #1 to #7000 as the training data, data #7001 to #8500 as the evaluation data and data #8501 to #10000 as the 15% of test data. In this case, data #1, which is training data, is input to a convolutional neural network, which is a learning model. The convolutional neural network outputs the clip value actually set for the image data before flattening, the number of repetitions of the process actually performed on that image data, and the image data after flattening the histogram obtained by actually performing the process on that image data. Each time input data that is training data is input to the convolutional neural network, and a clip value actually set for the image data before flattening, the number of repetitions of the process actually performed on that image data, and the image data after flattening the histogram obtained by actually performing the process on the image data are output from the convolutional neural network (in this case, each time that the data #1 to #7000 are each input to the convolutional neural network), parameters indicating the coupling weights of data between nodes are changed (i.e., the model of the convolution neural network is changed) by performing, for example, backpropagation in accordance with the output. The parameters are adjusted by inputting training data to the neural network in this way.

Next, the input data (data #7001 to #8500) that is evaluation data is sequentially input to the convolutional neural network in which the parameters have been changed on the basis of the training data. In accordance with the evaluation data that has been input, the convolutional neural network outputs clip values actually set for image data before flattening, the number of repetitions of the process actually performed on that image data, and the image data after flattening the histograms obtained by actually performing the process on the image data. In this case, if the data output by the convolutional neural network differs from the output data associated with the input data in FIG. 4, then the parameters are changed so that the outputs from the convolutional neural network become the output data associated with the input data in FIG. 4. The convolutional neural network (i.e., the learning model) in which the parameters have been determined in this way is a learned model.

Next, as a final check, the input data that is test data (data #8501 to #10000) is sequentially input to the convolutional neural network of the learned model. In accordance with the input test data, the convolutional neural network of the learned model outputs clip values actually set for the image data before flattening, the number of repetitions of the process actually performed on that image data, and the image data after flattening the histograms obtained by actually performing the process on the image data. If the output data output by the convolutional neural network of the learned model matches the output data associated with the input data in FIG. 4 for all of the test data, then the convolutional neural network of the learned model is a desired model. Additionally, if the output data output by the convolutional neural network of the learned model does not match the output data associated with the input data in FIG. 4 for even one of the test data, then the parameters of the learning model are determined by using new teacher data. The above-mentioned determination of the parameters of the learning model is repeated until a learned model having the desired parameters is obtained. When a learned model having the desired parameters is obtained, the learned model is recorded in the third processing unit 503.

It was explained that, in the learned model by which the above-mentioned third processing unit 503 predicts the number of repetitions of the process and the clip value, the input data is image data before flattening, and the output data is the clip value actually set for the image data before flattening, the number of repetitions of the process actually performed on that image data, and the image data after flattening the histograms obtained by actually performing the process on the image data. However, in the learned model in which the third processing unit 503 predicts the number of repetitions of the process and the clip value, the input data may be first histograms Y in addition to or instead of the image data before flattening, the output data may be second histograms Y1 in addition to or instead of the image data after flattening the histograms obtained by actually performing the process on the image data before flattening, and furthermore, the output data may be clip values actually set for the image data before flattening and the number of repetitions of the process actually performed on the image data before flattening. Furthermore, these input data and output data may be defined as first sets of data, and for example, 10000 sets of data may be prepared. FIG. 5 is a diagram indicating an example of teacher data different from FIG. 4. Using these 10000 sets of data, the parameters of the learning model are determined and recorded in the third processing unit 503 as a learned model. Furthermore, the third processing unit 503 may use this learned model to predict numbers of repetitions of the process and clip values.

The fourth processing unit 504 generates a Y1 signal (an example of a fifth signal) in which the brightness indicated by the Y signal has been changed based on the second histogram Y1. Specifically, the fourth processing unit 504 generates, as the Y1 signal, the brightness of the second histogram Y1 corresponding to each pixel. The fourth processing unit 504 may increase the brightness of the Y1 signal as the brightness of the Y signal decreases, and decrease the brightness of the Y1 signal as the brightness of the Y signal increases.

The fifth processing unit 505 changes the first color difference signal Xr, which includes values obtained by subtracting the Y signal from the R signal, to a first color difference signal Xr1 including values obtained by subtracting the Y1 signal from the R signal, in accordance with the change from the brightness Y to the brightness Y1 due to the fourth processing unit 504, when the information processing apparatus 50 performs signal processing on the Y signal, the R signal and the B signal. Additionally, the fifth processing unit 505 changes the second color difference signal Xb, obtained by subtracting the Y signal from the B signal, to a second color difference signal Xb1 including values obtained by subtracting the Y1 signal from the B signal, in accordance with the change from the brightness Y to the brightness Y1 due to the fourth processing unit 504, when the information processing apparatus 50 performs signal processing on the Y signal, the R signal and the B signal.

Specifically, when the information processing apparatus 50 performs signal processing on the Y signal, the R signal and the B signal, the fifth signal processing unit 505, for each pixel, changes the first color difference signal Xr, which includes values obtained by subtracting the Y signal from the R signal, to the first color difference signal Xr1, which includes values obtained by subtracting the Y1 signal from the R signal. Additionally, specifically, when the information processing apparatus 50 performs signal processing on the Y signal, the R signal and the B signal, the fifth processing unit 505, for each pixel, changes the second color difference signal Xb, which includes values obtained by subtracting the Y signal from the B signal, to the second color difference signal Xb1, which includes values obtained by subtracting the Y1 signal from the B signal. In the case in which the video signals handled by the information processing apparatus 50 are SD (Standard Definition) video signals, the first color difference signal Xr is the color difference signal Cr and the second color difference signal Xb is the color difference signal Cb. Additionally, in the case in which the video signals handled by the information processing apparatus 50 are HD (High Definition) video signals, the first color difference signal Xr is the color difference signal Pr and the second color difference signal Xb is the color difference signal Pb.

More specifically, in the case in which the information processing apparatus 50 performs signal processing on a Y signal, an R signal, and a B, which are SD video signals, if the fourth processing unit 504 has generated a Y1 signal by changing the brightness of the Y signal by a prescribed multiple, then the fifth signal processing unit 505 changes the first color difference signal Xr based on a signal (an example of a ninth signal) obtained by subtracting the Y1 signal from the signal that is a prescribed multiple of the R signal. Additionally, the fifth processing unit 505 changes the second color difference signal Xb based on a signal (an example of a tenth signal) obtained by subtracting the Y1 signal from the signal that is a prescribed multiple of the B signal. For example, the fifth processing unit 505, for each pixel, changes the first color difference signal Cr represented by Expression (1) to the first color difference signal Cr1 represented by Expression (2). Additionally, the fifth processing unit 505, for each pixel, changes the second color difference signal Cb represented by Expression (3) to the second color difference signal Cb1 represented by Expression (4).

[Mathematical Expression 1]

$$Cr=(R-Y)\cdot 0.713 \qquad (1)$$

[Mathematical Expression 2]

$$Cr1=(\alpha\cdot R-Y1)\cdot 0.713 \qquad (2)$$

[Mathematical Expression 3]

$$Cb=(B-Y)\cdot 0.564 \qquad (3)$$

[Mathematical Expression 4]

$$Cb1=(\alpha\cdot B-Y1)\cdot 0.564 \qquad (4)$$

Additionally, in the case in which the information processing apparatus 50 performs signal processing on a Y signal, an R signal, and a B, which are HD video signals, if the fifth processing unit 505 has generated a Y1 signal by changing the brightness of the Y signal by a prescribed multiple, then the fifth signal processing unit 505 generates a first color difference signal Xr1 (an example of an eleventh signal) and a second color difference signal Xb1 (an example of a twelfth signal) by multiplying, by a prescribed multiple, each of the generated first color difference signal Xr and the generated second color difference signal Xb based on the R signal, the B signal, and the G signal. For example, the fifth processing unit 505, for each pixel, changes the first color difference signal Pr represented by Expression (5) to the first color difference signal Pr1 represented by Expression (6). Additionally, the fifth processing unit 505, for each pixel, changes the second color difference signal Pb represented by Expression (7) to the second color difference signal Pb1 represented by Expression (8).

[Mathematical Expression 5]

$$Pr=(R-Y)\cdot 0.5389 \qquad (5)$$

[Mathematical Expression 6]

$$Pr1=(\alpha\cdot R-Y1)\cdot 0.5389 \qquad (6)$$

[Mathematical Expression 7]

$$Pb=(B-Y)\cdot 0.5389 \qquad (7)$$

[Mathematical Expression 8]

$$Pb1=(\alpha\cdot B-Y1)\cdot 0.5389 \qquad (8)$$

The value $\alpha$ (an example of the prescribed number) is the brightness Y1 divided by the brightness Y.

Additionally, in the case in which the information processing apparatus 50 performs signal processing on a Y signal, an R signal, a B signal, and a G signal, the fifth signal processing unit 505 generates a first color difference signal Xr and a second color difference signal Xb based on the R signal, the B signal, and the G signal. Furthermore, the fifth processing unit 505 changes the generated first color difference signal Xr to the first color difference signal Xr1 based on a change from the brightness Y to the brightness Y1 by the fourth processing unit 504. Additionally, the fifth processing unit 505 changes the generated second color difference signal Xb to the second color difference signal Xb1 based on a change from the brightness Y to the brightness Y1 by the fourth processing unit 504. In the case in which the video signals handled by the information processing apparatus 50 are SD video signals, the first color difference signal Xr is the color difference signal Cr and the second color difference signal Xb is the color difference signal Cb. Additionally, in the case in which the video signals handled by the information processing apparatus 50 are HD video signals, the first color difference signal Xr is the color difference signal Pr and the second color difference signal Xb is the color difference signal Pb.

Specifically, in the case in which the information processing apparatus 50 performs signal processing on a Y signal, an R signal, a B signal, and a G signal, which are SD video signals, the fifth processing unit 505, for each pixel, changes the first color difference signal Cr represented by Expression (9) to the first color difference signal Cr1 represented by Expression (10). Additionally, the fifth processing unit 505, for each pixel, changes the second color difference signal Cb represented by Expression (11) to the second color difference signal Cb1 represented by Expression (12).

[Mathematical Expression 9]

$$Cr=0.5\cdot R-0.41869\cdot G-0.081\cdot B \qquad (9)$$

[Mathematical Expression 10]

$$Cr1=\alpha(0.5\cdot R-0.41869\cdot G-0.081\cdot B) \qquad (10)$$

[Mathematical Expression 11]

$$Cb=-0.16874\cdot R-0.33126\cdot G-0.5\cdot B \qquad (11)$$

[Mathematical Expression 12]

$$Cb1=\alpha(-0.16874\cdot R-0.33126\cdot G-0.5\cdot B) \qquad (12)$$

Additionally, in the case in which the information processing apparatus 50 performs signal processing on a Y signal, an R signal, a B signal, and a G signal, which are HD video signals, the fifth processing unit 505, for each pixel, changes the first color difference signal Pr represented by Expression (13) to the first color difference signal Pr1 represented by Expression (14). Additionally, the fifth processing unit 505, for each pixel, changes the second color difference signal Pb represented by Expression (15) to the second color difference signal Pb1 represented by Expression (16).

[Mathematical Expression 13]

$$Pr=0.5 \cdot R-0.41869 \cdot G-0.081 \cdot B \qquad (13)$$

[Mathematical Expression 14]

$$Pr1=\alpha(0.5 \cdot R-0.41869 \cdot G-0.081 \cdot B) \qquad (14)$$

[Mathematical Expression 15]

$$Pb=-0.16874 \cdot R-0.33126 \cdot G-0.5 \cdot B \qquad (15)$$

[Mathematical Expression 16]

$$Pb1=\alpha(-0.16874 \cdot R-0.33126 \cdot G-0.5 \cdot B) \qquad (16)$$

The information processing apparatus 50 may execute processes other than the above-mentioned processes. The processes performed by the information processing apparatus 50 including processes other than the above-mentioned processes that can be executed by the information processing apparatus 50 will be explained in detail in the explanation of the processing flow below.

Next, processes performed by the information processing apparatus 50 will be explained with reference to the processing flow indicated in FIG. 6 to 9.

(Process Performed by Information Processing Apparatus)

Figure 6:
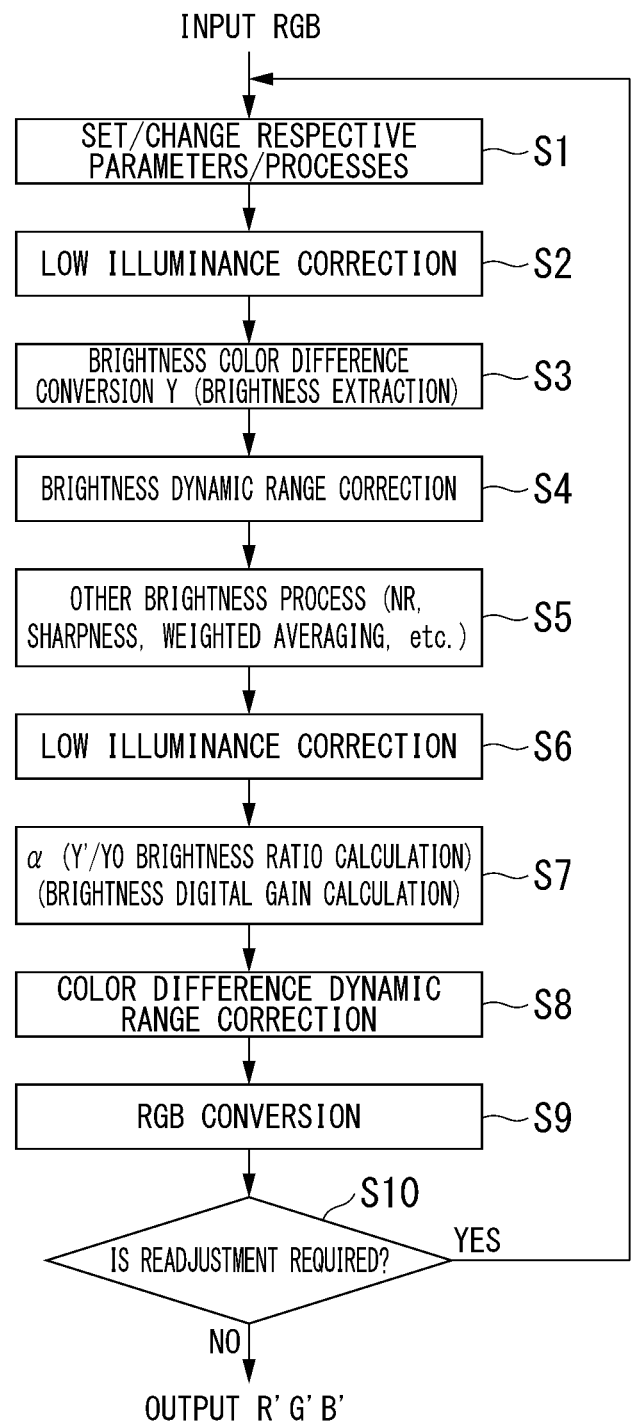
FIG. 6 is a diagram indicating an example of the processing flow of the overall process performed by the information processing apparatus according to an embodiment disclosed herein.

FIG. 6 is a diagram indicating an example of the processing flow for the entire process performed by the information processing apparatus 50 according to an embodiment disclosed herein. When the information processing apparatus 50 receives an RGB signal, the first processing unit 501 executes processes such as setting the signal processing to be described below, setting and changing the parameters required for signal processing to be described below, and the like (step S1). For example, whether to execute a process for correcting for low illuminance with respect to the RGB signal, whether to execute this process with respect to the Y signal, whether to skip this process without executing the process for correcting for low illuminance and the like are set. When skipping is set, the process for correcting for low illuminance is not performed. Examples of the process for correcting for low illuminance include processes for changing the image by using the retinex theory, such as a process using SSR (Single Scale Retinex), and the like. In the process using the retinex method, for example, a center/surround model, i.e., a log (Y1/Gaussian filter (Y1)) filter or the like is used. This process using the retinex method is a process that involves increasing the brightness of the Y1 signal as the brightness of the Y signal decreases and decreasing the brightness of the Y1 signal as the brightness of the Y signal increases, i.e., correcting the brightness to be higher as the brightness in an image becomes lower and correcting the brightness to be lower as the brightness in the image becomes higher. The process using the retinex method merely requires to make the brightness higher as the brightness in the image becomes lower and to make the brightness lower as the brightness in the image becomes higher, and the process is not limited to one using the center/surround model, i.e., a log (Y1/Gaussian filter (Y1)) filter or the like. Additionally, for example, in the case in which the user is to designate a clip value, which is one of the parameters, the first processing unit 501 receives an input designating the clip value by the user, and sets the received clip value. Additionally, in the case in which the value of a parameter designated by the user is different from a value that is already set, the first processing unit 501 changes the parameter value that has been set to the parameter value designated by the user. By executing the process using the retinex method, an image that is dark overall so that the image capture target is difficult to discern can be changed to an image in which the image capture target is easy to discern. For example, there is no need to adjust the image quality even when images are captured during the day and at night.

When the process in step S1 ends, the fourth processing unit 504 executes a correction of low brightness (step S2) regarding the RGB signal (in the case in which the first processing unit 501 has performed signal processing on the RGB signal, the RGB signal that has undergone signal processing).

Figure 7:
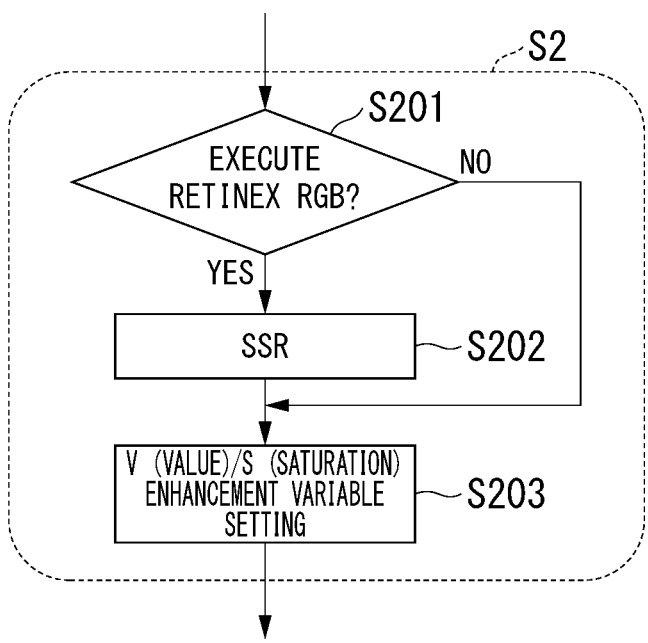
FIG. 7 is a diagram indicating an example of the processing flow of a process in step S2 performed by the information processing apparatus according to an embodiment disclosed herein.

FIG. 7 is a diagram indicating an example of the processing flow for the process in step S2 performed by the information processing apparatus 50 according to an embodiment disclosed herein. The process for correcting low brightness performed by the fourth processing unit 504 in the process in step S2 will be explained with reference to FIG. 7.

In the process in step S2, the fourth processing unit 504 determines whether or not to execute low brightness correction regarding the RGB signal (step S201). Upon determining that low brightness correction is to be executed on the RGB signal (YES in step S201), the fourth processing unit 504 executes a process using the SSR method (step S202). Furthermore, the fourth processing unit 504 executes a process for enhancing V (value)/S (saturation), and sets variables for the value and the saturation after the process has been executed (step S203). Additionally, upon determining that low brightness correction is not to be executed on the RGB signal (NO in step S201), the fourth processing unit 504 advances to the process in step S203.

When the process in step S2 ends, the first processing unit 501 converts the RGB signal to a Y signal, a color difference signal Xr, and a color difference signal Xb (step S3).

When the process in step S3 ends, the information processing unit 50 executes a process for correcting the dynamic range of the brightness (step S4).

Specifically, the second processing unit 502 sets a clip value in the first histogram Y identified by the first processing unit 501. The first processing unit 501 divides an image indicated by multiple pixels into M×N images (for example, dividing the image into 1×1 image so that the entirety is a single image), and identifies first histograms Y that are histograms of the brightness (i.e., the Y signal) of each image after the division. The third processing unit 503 subtracts, from a first histogram Y, a portion y near the peak of the first histogram Y, based on the clip value. Furthermore, the third processing unit 503 shifts a histogram y1 corresponding to the subtracted portion y of the first histogram Y to an area of the first histogram Y at which the values are at least relatively low. By repeating this process a required number of times, the third processing unit 503 generates a second histogram Y1 that is a brightness histogram. The number of repetitions of the process is to be repeated may be determined by a user checking the image each time the process is performed once, and stopping the process upon determining that a desired image has been obtained. Additionally, the number of repetitions of the process may be predetermined. Additionally, the number of repetitions of the process may be determined by using AI technology, together with the clip value. For example, the third processing unit 503 may predict the clip value and the number of repetitions of the process by using a learned model (for example, a convolutional neural network) for which parameters have been decided by using teacher data, which is a type of machine learning.

Figure 8:
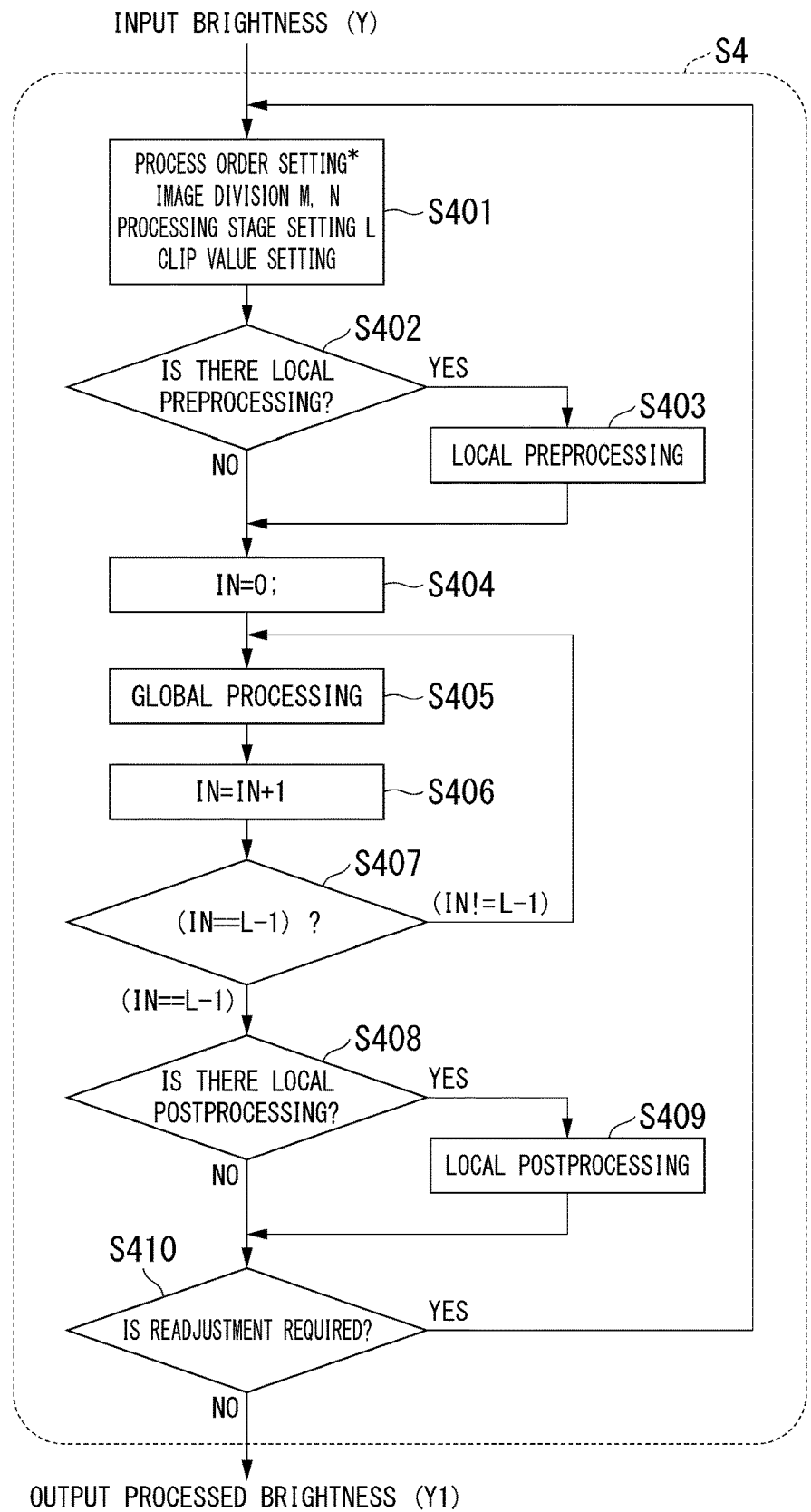
FIG. 8 is a diagram indicating an example of the processing flow of a process in step S4 performed by the information processing apparatus according to an embodiment disclosed herein.

FIG. 8 is a diagram indicating an example of the processing flow for the process in step S4 performed by the information processing apparatus 50 according to an embodiment disclosed herein. The process for correcting low brightness performed by the information processing apparatus 50 in the process in step S4 will be explained with reference to FIG. 8.

In the process in step S4, the first processing unit 501 sets the number M×N of divisions into which an image indicated by multiple pixels is to be divided (step S401). Additionally, the second processing unit 502 sets a clip value (step S401). Additionally, the third processing unit 503 sets a number L of repetitions of the process (step S401). Furthermore, the first processing unit 501 flattens the histogram regarding the brightness (i.e., the Y signal) by dividing the image indicated by the multiple pixels into M×N (for example, dividing the image into 1×1 image so that the entirety is a single image), and also flattens the histogram regarding the brightness by dividing, for preprocessing to be described below or postprocessing to be described below, into a relatively large number (for example, dividing the image into 8×8 so that there are 64 images in all) with respect to the M×N divisions of the aforementioned image, thereby identifying first histograms Y that are histograms of the brightness in each image after division.

The third processing unit 503 determines whether or not there is to be preprocessing (i.e., a process of flattening the histograms with respect to brightness of images with a lot of divisions) of the images after being divided into M×N (step S402). Upon determining that there is to be preprocessing (YES in step S402), the third processing unit 503 executes a process of flattening the histograms by using the clip value regarding the brightness of the M×N divided images (for example, 64 images obtained by division into 8×8) (step S403). In other words, the process in step S403 is for flattening, in detail, the histograms for the entire image by means of this preprocessing before performing the processes of steps S404 to step S407 to be described below. Furthermore, the third processing unit 503 sets, to zero, the initial value of a value IN used for determining the ending of the number of times the process is to be repeated (step S404). Additionally, upon determining that there will be no preprocessing (NO in step S402), the third processing unit 503 advances to the process in step S404.

The third processing unit 503, for each of the images divided into M×N (for example, a single image for the entirety obtained by dividing the image into 1×1), from the first image to the (M×N)-th image, shifts a histogram y1 corresponding to the subtracted portion y of a first histogram Y to an area of the first histogram Y at which the values are at least relatively low (step S405). The third processing unit 503 increments the value IN by 1 (step S406).

The third processing unit 503 determines whether or not the value IN defined by the process in step S406 is equal to the value obtained by subtracting 1 from the number L of times the process has been repeated (step S407). Upon determining that the value IN is different from the value obtained by subtracting 1 from the number L of times the process has been repeated (NO in step S407), the third processing unit 503 returns to the process in step S405. If the value IN is determined to be equal to the value obtained by subtracting 1 from the number L of times the process has been repeated (YES in step S407), then the fourth processing unit 504, based on the second histogram Y1, generates a Y1 signal obtained by changing the brightness indicated by the Y signal. The fourth processing unit 504 determines whether or not there is to be postprocessing (i.e., a process of flattening the histograms regarding the brightness of images with a lot of divisions) (step S408). Upon determining that there is to be postprocessing (YES in step S408), the fourth processing unit 504 executes a process of flattening the histograms by using the clip value regarding the brightness of the M×N divided images (for example, 64 images obtained by dividing into 8×8) (step S409). In other words, the process in step S409 is for flattening the histograms in detail for the entire image by means of this preprocessing after performing the processes of steps S404 to step S407. Furthermore, the fourth processing unit 504 determines whether or not re-adjustment is required (step S410). For example, the fourth processing unit 504 determines whether or not the preset number of times L−1 to perform the process has been reached. Then, upon determining that the preset number of times L−1 to perform the process has not been reached, the fourth processing unit 504 determines that re-adjustment is required. Additionally, upon determining that the preset number of times L−1 to perform the process has been reached, the fourth processing unit 504 determines that re-adjustment is not required. The fourth processing unit 504 may determine whether or not re-adjustment is required based on the histogram distribution, using a prescribed determiner. Upon determining that re-adjustment is required (YES in step S410), the fourth processing unit 504 returns the process to step S401. Additionally, upon determining that re-adjustment is not required (NO in step S410), the fourth processing unit 504 outputs the Y1 signal indicating the brightness after processing.

As described above, by reducing the number of the M×N divisions of the image (for example, by dividing the image into 1×1) and repeating the process of flattening the brightness histogram L−1 times, and also by increasing the number of the M×N divisions of the image (for example, by dividing the image into 8×8) and performing the process of flattening the brightness histogram one time by means of preprocessing or postprocessing, the contrast ratio can be made greater than that in the case in which the number of the M×N divisions of the image is increased (for example, by dividing the image into 8×8) and repeating the process of flattening the brightness histogram L times.

In another embodiment, both preprocessing and postprocessing may be performed. In this case, the brightness can be appropriately corrected and the contrast ratio can be raised by implementing processing using the retinex method. Additionally, in another embodiment, neither preprocessing nor postprocessing may be performed. In this case, the contrast ratio can be raised by increasing the number of times the process of flattening the brightness histogram is performed on images with relatively few number of divisions (for example, an image divided into 1×1).

In the case in which there are other processes relating to the brightness, the fourth processing unit 504 executes those processes (step S5). Examples of other processes relating to the brightness include processes such as those for NR (Noise Reduction), sharpness, and weighted averaging.

When the processing in step S5 ends, the fourth processing unit 504 corrects for low brightness regarding the Y1 signal (step S6) after the processing in step S5. The process of correcting for low brightness in step S6 is also performed on the Y1 signal, and can thus reduce the number of operations in comparison with the process of correcting for low brightness regarding the RGB signal in step S2.

Figure 9:
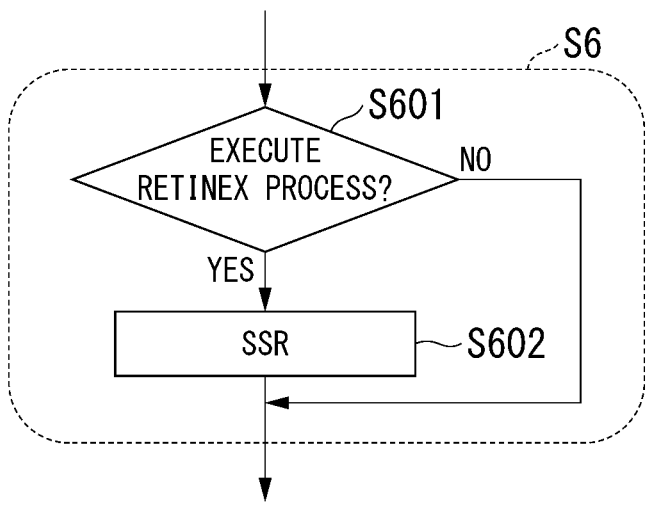
FIG. 9 is a diagram depicting an example of the processing flow of a process in step S6 performed by the information processing apparatus according to an embodiment disclosed herein.

FIG. 9 is a diagram depicting an example of the processing flow for the processing in step S6 performed by the information processing apparatus 50 according to an embodiment disclosed herein. The process of correcting for low brightness performed by the fourth processing unit 504 in the process in step S6 will be explained with reference to FIG. 9.

In the process in step S6, the fourth processing unit 504 determines whether or not to correct the Y1 signal for low brightness (step S601). Upon determining that the Y1 signal is to be corrected for low brightness (YES in step S601), the fourth processing unit 504 executes a process using the SSR method (step S602). Upon determining that the Y1 signal is not to be corrected for low brightness (NO in step S601), the fourth processing unit 504 advances to the process in step S7.

The fifth processing unit 505 identifies the value α by dividing the Y1 signal that has undergone the process in step S6 with the Y signal obtained by the process in step S3 (step S7).

When the process in step S7 ends, the information processing apparatus 50 executes a process for correcting the dynamic range of the color difference (step S8).

Specifically, in the case in which the information processing apparatus 50 is to process SD video signals by using the value a obtained by the process in step S7 on the color difference signal Xr and the color difference signal Xb obtained by the process in step S3, the fifth processing unit 505 identifies a color difference signal Cr1 and a color difference signal Cb1 by using Expression (2) and Expression (4). Additionally, in the case in which the information processing apparatus 50 is to process HD video signals by using the value α obtained by the process in step S7 on the color difference signal Xr and the color difference signal Xb obtained by the process in step S3, the fifth processing unit 505 identifies a color difference signal Pr1 and a color difference signal Pb1 by using Expression (6) and Expression (8).

Additionally, specifically, in the case in which the information processing apparatus 50 is to process SD video signals by using the value α obtained by the process in step S7 on an RGB signal received by the information processing apparatus 50, the fifth processing unit 505 may identify a color difference signal Cr1 and a color difference signal Cb1 by using Expression (10) and Expression (12). Additionally, in the case in which the information processing apparatus 50 is to process HD video signals by using the value α obtained by the process in step S7 on an RGB signal received by the information processing apparatus 50, the fifth processing unit 505 may identify a color difference signal Pr1 and a color difference signal Pb1 by using Expression (14) and Expression (16).

The fifth processing unit 505 converts the Y1 signal on which the process in step S6 has been performed and the color difference signals Xr1 and Xb1 identified by the process in step S8 to an RGB signal (step S9). Furthermore, the fifth processing unit 505 determines whether or not readjustment is required (step S10). For example, the fifth processing unit 505 determines whether or not a preset number of times that the process is to be performed has been reached. Furthermore, upon determining that the preset number of times that the process is to be performed has not been reached, the fifth processing unit 505 determines that readjustment is required. Additionally, upon determining that the preset number of times that the process is to be performed has been reached, the fifth processing unit 505 determines that readjustment is not required. The fifth processing unit 505 may determine whether or not readjustment is required based on the RGB signal, using a prescribed determiner. Upon determining that readjustment is required (YES in step S10), the fifth processing unit 505 returns to the process in step S1. Additionally, upon determining that readjustment is not required (NO in step S10), the fifth processing unit 505 outputs the converted RGB signal.

An information processing system 1 according to an embodiment disclosed herein has been explained above. The information processing apparatus 50 in the information processing system 1 comprises a first processing unit 501, a second processing unit 502, and a third processing unit 503. The first processing unit 501 defines an entirety indicated by multiple pixels as a single image, and identifies a first histogram that is a histogram of the brightness of the image. The second processing unit 502 sets an adjustment amount in the first histogram. The third processing unit 503 subtracts, from the first histogram, a portion near the peak of the first histogram, based on the adjustment amount, and shifts a histogram corresponding to that portion to an area of the first histogram at which the peak is at least relatively low, thereby generating a second histogram.

In this manner, the information processing apparatus 50 can correct the dynamic range of the video signal.

Additionally, in this manner, the information processing apparatus 50 can execute complicated operations on a single brightness signal and apply only the results of those operations to a color difference signal without executing complicated operations on each of three RGB signals. As a result thereof in comparison with the case in which complicated operations are performed on each of the three RGB signals, the complicated operations can be executed on one brightness signal, and only the results of those operations can be applied to the color difference signal, thereby allowing the amount of operations in the information processing apparatus 50, in other words, the consumed electric power required for the operations and the time for the operations, to be reduced.

Additionally, in this manner, the information processing apparatus 50 can be realized by means of a general-purpose computer such as a personal computer that performs processes by means of software rather than expensive dedicated hardware that performs the processes by means of hardware regarding the three RGB signals.

Additionally, in this manner, the information processing apparatus 50 can be realized by means of a general-purpose computer that performs relatively low-bit processes (for example, 8-bit processes) in which the processes are performed by software.

Figure 10:
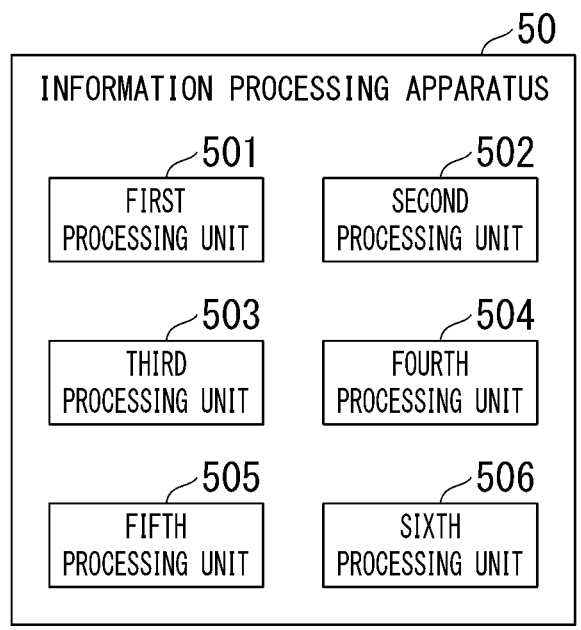
FIG. 10 is a diagram depicting an example of the configuration of an information processing apparatus according to another embodiment disclosed herein.

In another embodiment disclosed herein, the information processing apparatus 50 may be installed in a camera for capturing still images and moving images. FIG. 10 is a diagram depicting an example of the configuration of an information processing apparatus 50 according to another embodiment disclosed herein. For example, the information processing apparatus 50 comprises a sixth processing unit 506, as indicated in FIG. 10. The sixth processing unit 506 performs a camera contrast AF (Autofocus) process. A contrast AF (Autofocus) process is a process of finding and focusing on areas with high contrast. The information processing apparatus 50 can raise the contrast ratio. For this reason, by using this image as the image in the camera contrast AF process, the sixth processing unit 506 can more easily focus on an image capture target in comparison with the case in which an image that has not had the contrast ratio increased by the information processing apparatus 50 is used.

Figure 11:
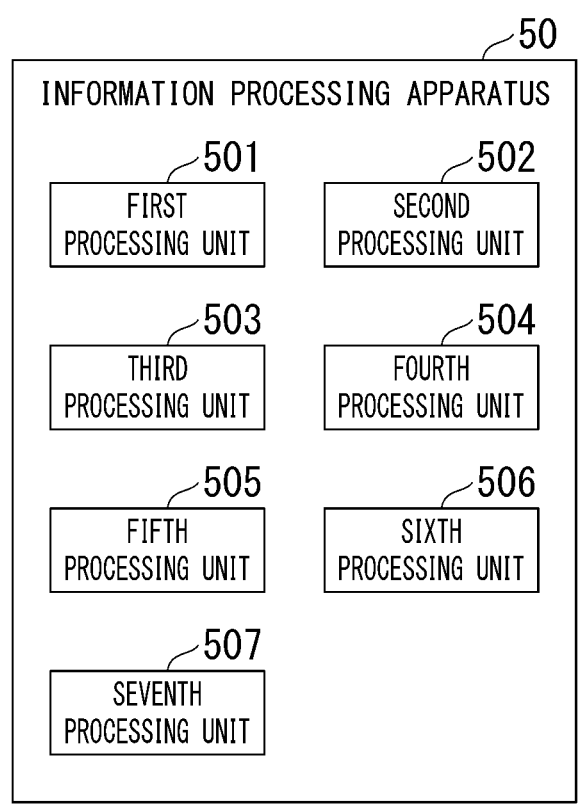
FIG. 11 is a diagram depicting an example of the configuration of an information processing apparatus according to another embodiment disclosed herein.

In another embodiment disclosed herein, some or all of the processes performed by the ISP 20 may be performed by the information processing apparatus 50. FIG. 11 is a diagram depicting an example of the configuration of an information processing apparatus 50 according to another embodiment disclosed herein. For example, the information processing apparatus 50 comprises a seventh processing unit 507 as indicated in FIG. 11. The seventh processing unit 507 only requires to execute some or all of the processes performed by the ISP 20. In this manner, the ISP 20 can be simply and inexpensively realized or the ISP 20 becomes unnecessary, and the information processing apparatus 50 can realize some or all of the processes performed by the ISP 20 by changing the software run by a general-purpose computer.

Figure 12:
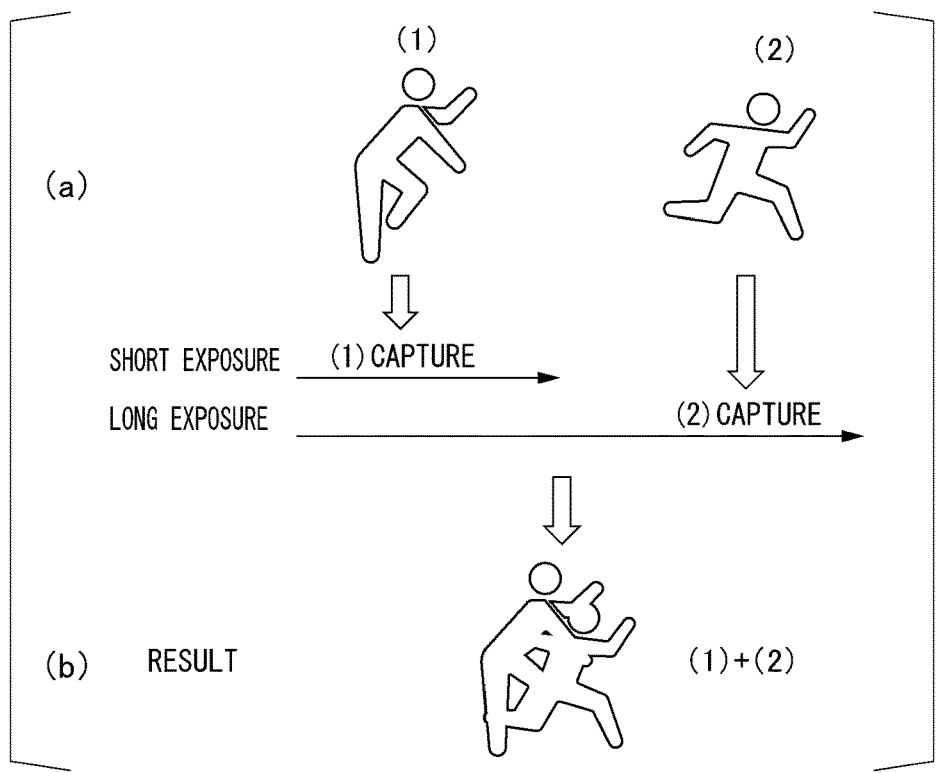
FIG. 12 is a first diagram for explaining the effects of an HDR process performed by a seventh processing unit according to another embodiment disclosed herein.
Figure 13:
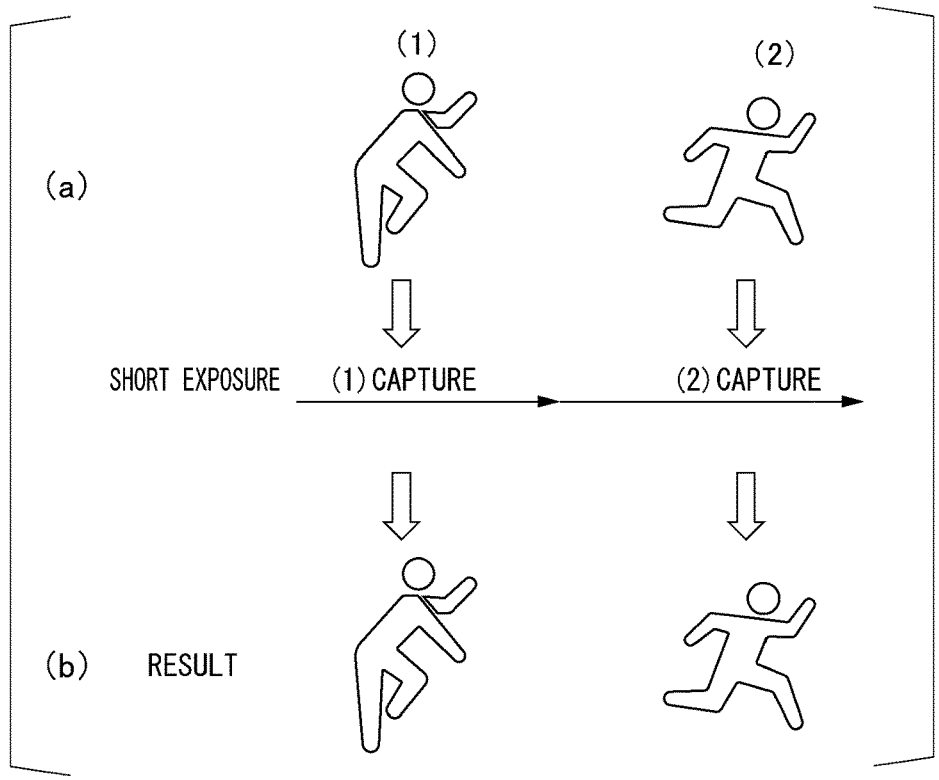
FIG. 13 is a second diagram for explaining the effects of an HDR process performed by a seventh processing unit according to another embodiment disclosed herein.

In another embodiment disclosed herein, the information processing apparatus 50 may perform an HDR process. For example, the information processing apparatus 50 comprises a seventh processing unit 507 as indicated in FIG. 11. The seventh processing unit 507 only requires to perform an HDR process. In this case, problems that occur when the ISP 20 performs the HDR process can be avoided. FIG. 12 is a first diagram for explaining the effects of the HDR process performed by the seventh processing unit 507 according to another embodiment disclosed herein. FIG. 12 indicates an example of a conventional HDR process performed by the ISP 20. FIG. 13 is a second diagram for explaining the effects of the HDR process performed by the seventh processing unit 507 according to another embodiment disclosed herein. FIG. 13 indicates an example of an HDR process performed by the seventh processing unit 507.

In a conventional HDR process performed by the ISP 20, as indicated in section (a) in FIG. 12, the images of two frames captured with two or more different exposure times are combined. For this reason, if an image capture target moves during a long exposure, the image will not match an image captured with a short exposure, as a result of which an image in which two image capture targets are superimposed will be obtained, as indicated by section (b) in FIG. 12. In contrast therewith, in the HDR process performed by the seventh processing unit 507, the image processing will be performed on single frames obtained by short exposure for each image capture target, as indicated by section (a) in FIG. 13. For this reason, as a result, the two image capture targets will not be superimposed as in a conventional HDR process as indicated by section (b) in FIG. 13. Additionally, since the HDR process performed by the seventh processing unit 507 is a short-exposure single-frame process, a high-frame-rate process can be realized in comparison with a conventional HDR process.

In an embodiment disclosed herein, the fifth processing unit 505 was explained as converting the Y1 signal on which the process in step S6 was performed and the color difference signals Xr1, Xb1 identified by the process in step S8 into RGB signals. However, in another embodiment disclosed herein, the fifth processing unit 505 may convert each of the RGB signals (i.e., each of the R signal, the G signal, and the B signal) received by the information processing apparatus 50 into RGB signals in which the brightness has been changed (the contrast has been changed) by multiplying the value α obtained by the process in step S7.

The order of the processes in the embodiments disclosed herein may be switched within the range in which appropriate processes are performed. Some of the processes may be skipped, or some of the processes may be performed multiple times. For example, some of the processes may be performed multiple times at the same timing, or some of the processes may be performed multiple times by being performed again at different timings. For example, the information processing apparatus 50 may perform the process for correcting the dynamic range of the brightness (step S4) after correcting for the low luminance (step S6), and identify the value α (step S7).

As explained regarding the embodiments disclosed herein, the information processing system 1, the information processing apparatus 50, or another control apparatus mentioned above may have a computer system contained therein. Furthermore, the steps in the above-mentioned processes are stored in the form of a program on a computer-readable recording medium, and the above-mentioned processes are performed by a computer reading out and executing this program. A specific example of the computer is indicated below.

Figure 14:
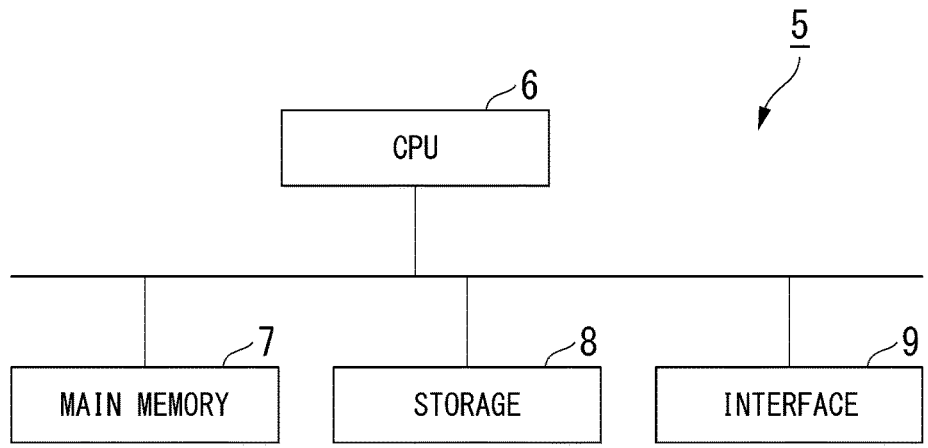
FIG. 14 is a schematic block diagram depicting the configuration of a computer according to at least one embodiment.

FIG. 14 is a schematic block diagram depicting the configuration of a computer according to at least one embodiment. As indicated in FIG. 14, the computer 5 is provided with a CPU 6, a main memory 7, a storage 8, and an interface 9.

For example, each of the information processing system 1, the information processing apparatus 50, and the other control apparatus mentioned above are installed on a computer 5. Furthermore, the actions of the respective processing units mentioned above are stored in the storage 8 in the form of a program. The CPU 6 reads the program from the storage 8 and loads it in the main memory 7, and executes the above-mentioned processes in accordance with said program. Additionally, the CPU 6 secures, in the main memory 7, storage areas corresponding to each of the storage units mentioned above, in accordance with the program.

Examples of the storage 8 include an HDD (Hard Disk Drive), an SSD (Solid State Drive), a magnetic disc, a magneto-optic disc, a CD-ROM (Compact Disc Read-Only Memory), a DVD-ROM (Digital Versatile Disc Read-Only Memory), a semiconductor memory, and the like. The storage 8 may be internal media directly connected to a bus in the computer 5 or may be external media connected to the computer 5 via an interface 9 or a communication line. Additionally, in the case in which this program is transmitted to the computer 5 by means of a communication line, the computer 5 that has received the transmission may load said program in the main memory 7 and execute the above-mentioned processes. In at least one embodiment, the storage 8 is a non-transitory, tangible storage medium.

Additionally, the above-mentioned program may realize just some of the aforementioned functions. Furthermore, the above-mentioned program may be a file, i.e., a so-called difference file (difference program), that can realize the aforementioned functions by being combined with a program that is already recorded on the computer system.

Figure 15:
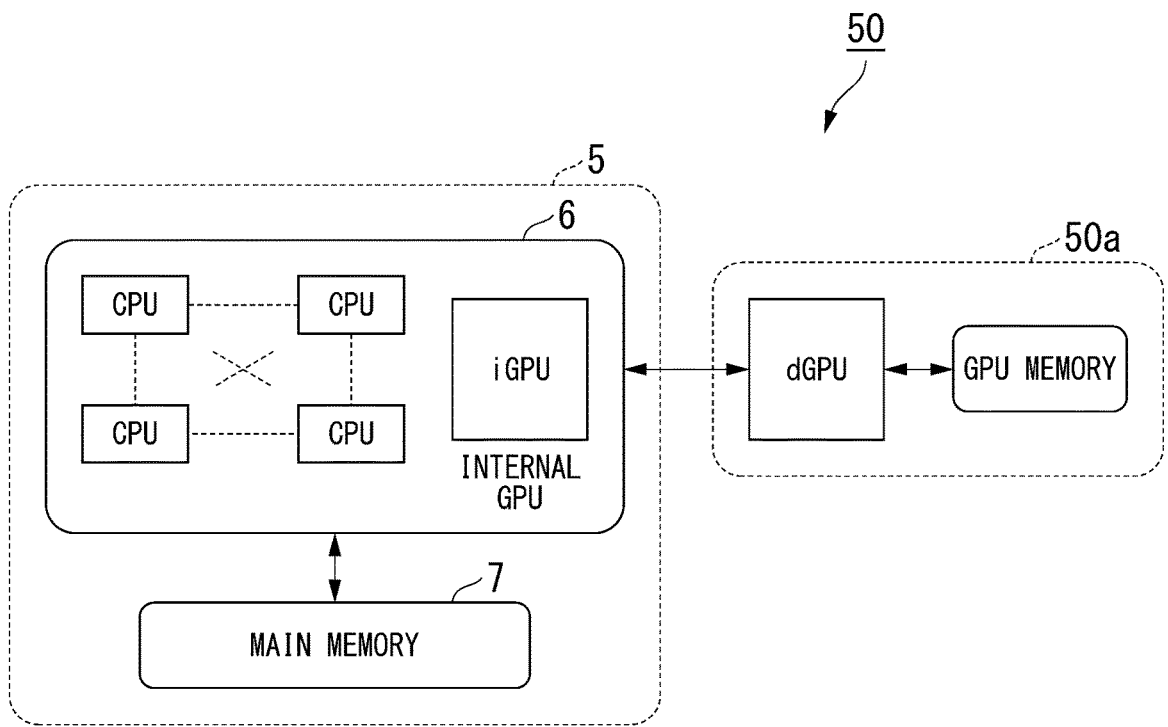
FIG. 15 is a diagram depicting an example of mounting of an information processing apparatus according to an embodiment disclosed herein.

FIG. 15 is a diagram depicting an example of mounting of an information processing apparatus 50 according to an embodiment disclosed herein. The information processing apparatus 50 is mounted on the computer 5 in combination with an external GPU (Graphics Processing Unit) 50a. In recent years, CPUs 6 almost all have multiple cores and include a GPU. In the case in which the information processing apparatus 50 is mounted in this manner, it is possible to support parallel programming processes that are highly parallel processes using a GPU. Additionally, in the case in which the specifications support an iGPU, a dGPU is unnecessary (i.e., an external GPU is unnecessary) and costs can be reduced.

Figure 16:
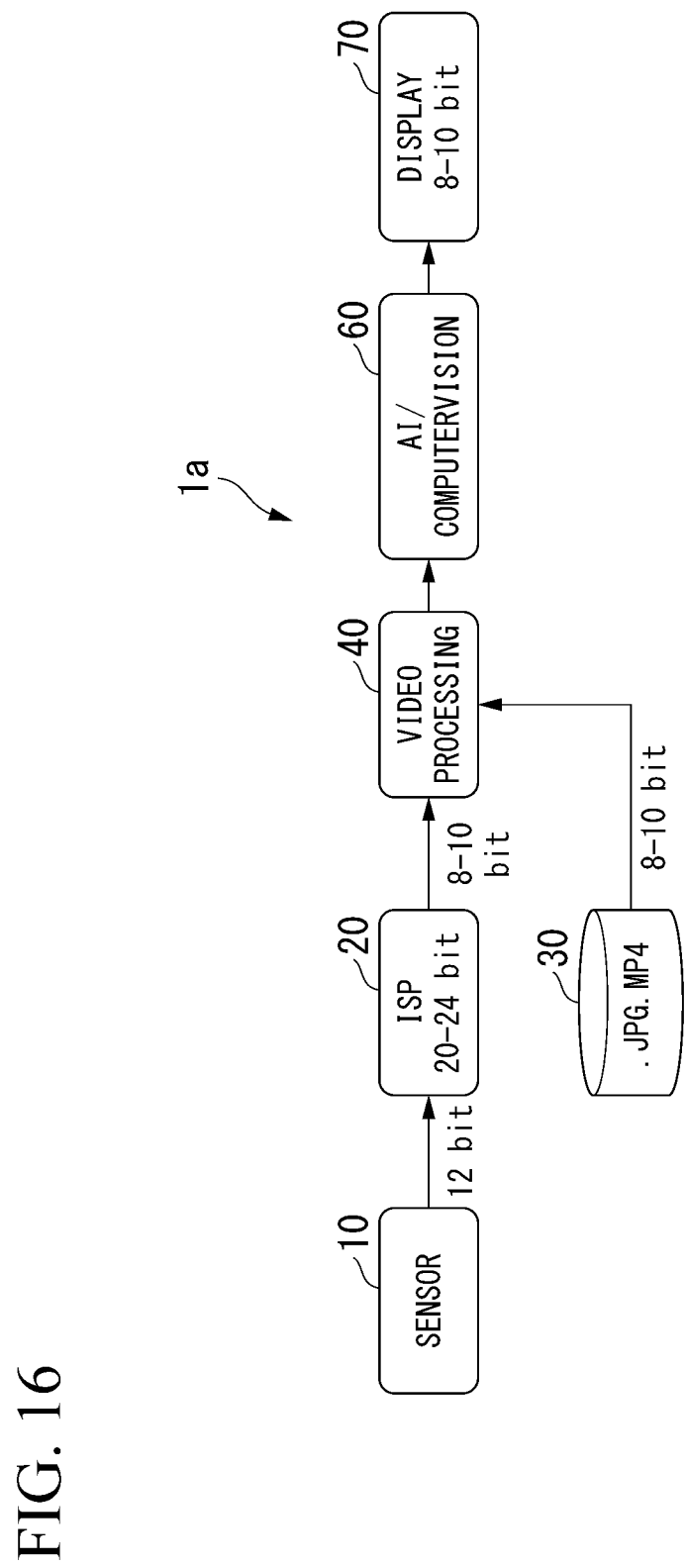
FIG. 16 is a diagram depicting an example of the configuration of an information processing system for comparison.

As mentioned above, a number of technologies have been proposed regarding an information processing apparatus, an information processing method, and a program. For example, even in the case in which processing with a bit depth of, for example, 20 to 24 bit is performed by an ISP (Image Signal Processor) as in the information processing system 1a indicated in FIG. 16, if the bit depth of a display is lower (for example, 8 to 10 bit) than the bit depth of said processing, then video processing is executed at a bit depth in accordance with the bit depth of the display. For this reason, there is a possibility that the video displayed on the display will include under-exposed or over-exposed sections and thus have poor visibility.

For this reason, technology that can correct the dynamic range of video signals is sought.

According to at least one exemplary embodiment, for example, the dynamic range of the video signal can be corrected.

While a number of embodiments of the present disclosure have been explained, these embodiments are exemplary and do not limit the scope of the invention. Various additions, omissions, substitutions, and modifications may be made to these embodiments within a range not departing from the spirit of the invention.

Some or all of the above-mentioned embodiments may be described as in the appendices below, though the invention is not limited to those indicated below.

APPENDIX 1

An information processing apparatus comprising:
a first processing unit configured to define an entirety indicated by multiple pixels as a single image, and identify a first histogram that is a histogram of brightness in the image;
a second processing unit configured to set an adjustment amount in the first histogram; and
a third processing unit configured to subtract, from the first histogram, a portion near a peak of the first histogram, based on the adjustment amount, and shift a histogram corresponding to the portion to an area of the first histogram at which the peak is at least relatively low to generate a second histogram.

APPENDIX 2

The information processing apparatus according to appendix 1,
the information processing apparatus performing signal processing on a first signal indicating a brightness, a second signal associated with a first color, and a third signal associated with a second color, or the first signal, the second signal, the third signal, and a fourth signal associated with a third color,
wherein the information processing apparatus comprises:
a fourth processing unit configured to generate a fifth signal in which a brightness indicated by the first signal has been changed based on the second histogram; and
a fifth processing unit configured to
change, in a case in which signal processing is to be performed on the first signal, the second signal, and the third signal, in accordance with a change in the brightness by the fourth processing unit, a first color difference signal including a value obtained by subtracting the first signal from the second signal to a first color difference signal including a value obtained by subtracting the fifth signal from the second signal, and change a second color difference signal including a value obtained by subtracting the first signal from the third signal to a second color difference signal including a value obtained by subtracting the fifth signal from the third signal, and
generate, in a case in which signal processing is to be performed on the first signal, the second signal, the third signal, and the fourth signal, a first color difference signal and a second color difference signal based on the second signal, the third signal, and the fourth signal, and change the generated first color difference signal and the generated second color difference signal based on a change in the brightness by the fourth processing unit.

APPENDIX 3

The information processing apparatus according to appendix 2, wherein:
in the case in which the signal processing is to be performed on the first signal, the second signal, and the third signal,
the fifth processing unit is configured to,
change, when the fourth processing unit generates the fifth signal by changing the brightness of the first signal by multiplication with a prescribed multiple, the first color difference signal based on a ninth signal obtained by subtracting the fifth signal from a signal obtained by multiplying the second signal with the prescribed multiple, and change the second color difference signal based on a tenth signal obtained by subtracting the fifth signal from a signal obtained by multiplying the third signal with the prescribed multiple; and
in the case in which the signal processing is to be performed on the first signal, the second signal, the third signal, and the fourth signal,
the fifth processing unit is configured to,
generate, when the fourth processing unit generated the fifth signal by changing the brightness of the first signal by multiplication with a prescribed multiple, an eleventh signal and a twelfth signal by multiplying, by the prescribed multiple, each of the first color difference signal and the second color different signal that are generated based on the second signal, the third signal, and the fourth signal.

APPENDIX 4

The information processing apparatus according to appendix 2 or 3, wherein:
the fourth processing unit is configured to
increase the brightness of the fifth signal as the brightness of the first signal decreases, and decrease the brightness of the fifth signal as the brightness of the first signal increases.

APPENDIX 5

The information processing apparatus according to appendix 4, wherein:
the fourth processing unit is configured to
execute, with double precision, operations in the process for increasing the brightness of the fifth signal as the brightness of the first signal decreases, and for decreasing the brightness of the fifth signal as the brightness of the first signal increases.

APPENDIX 6

The information processing apparatus according to appendix 4 or 5, wherein:
the brightness of the fifth signal is increased as the brightness of the first signal decreases and the brightness of the fifth signal is decreased as the brightness of the first signal increases by using a retinex method for changing an image by using retinex theory.

APPENDIX 7

The information processing apparatus according to any one of appendixes 1 to 6, comprising:
a sixth processing unit configured to perform a contrast autofocus process by using an image in which the brightness has been corrected based on the second histogram generated by the third processing unit.

APPENDIX 8

The information processing apparatus according to any one of appendixes 1 to 7, comprising:
a seventh processing unit configured to perform an HDR process based on an image in which the brightness has been corrected based on the second histogram generated by the third processing unit.

APPENDIX 9

An information processing method comprising:
defining an entirety indicated by multiple pixels as a single image, and identifying a first histogram that is a histogram of brightness in the image;
setting an adjustment amount in the first histogram; and
subtracting, from the first histogram, a portion near a peak of the first histogram, based on the adjustment amount, and shifting a histogram corresponding to the portion to an area of the first histogram at which the peak is at least relatively low to generate a second histogram.

APPENDIX 10

A non-transitory computer-readable storage medium storing a program that causes a computer to execute processes, the processes comprising:
defining an entirety indicated by multiple pixels as a single image, and identifying a first histogram that is a histogram of brightness in the image;
setting an adjustment amount in the first histogram; and
subtracting, from the first histogram, a portion near a peak of the first histogram, based on the adjustment amount, and shifting a histogram corresponding to the portion to an area of the first histogram at which the peak is at least relatively low, thereby generating a second histogram.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. An information processing apparatus comprising:
a processing circuitry configured to:
define an entirety indicated by multiple pixels as a single image, and identify a first histogram that is a histogram of brightness in the image;
set an adjustment amount in the first histogram; and
subtract, from the first histogram, a portion of a frequency of an area near a peak of the first histogram, based on the adjustment amount, and increase the frequency of at least an area of the first histogram at which the frequency is relatively low using the subtracted portion of the frequency of the area near the peak, to generate a second histogram.
2. The information processing apparatus according to claim 1,
the information processing apparatus performing signal processing on a first signal indicating a brightness, a second signal associated with a first color, and a third signal associated with a second color, or the first signal, the second signal, the third signal, and a fourth signal associated with a third color,
wherein the processing circuitry is further configured to:
generate a fifth signal in which a brightness indicated by the first signal has been changed based on the second histogram,
change, in a case in which signal processing is to be performed on the first signal, the second signal, and the third signal, in accordance with a change in the brightness, a first color difference signal including a value obtained by subtracting the first signal from the second signal to a first color difference signal including a value obtained by subtracting the fifth signal from the second signal, and change a second color difference signal including a value obtained by subtracting the first signal from the third signal to a second color difference signal including a value obtained by subtracting the fifth signal from the third signal, and
generate, in a case in which signal processing is to be performed on the first signal, the second signal, the third signal, and the fourth signal, a first color difference signal and a second color difference signal based on the second signal, the third signal, and the fourth signal, and change the generated first color difference signal and the generated second color difference signal based on a change in the brightness.
3. The information processing apparatus according to claim 2, wherein:
in the case in which the signal processing is to be performed on the first signal, the second signal, and the third signal,
the processing circuitry is configured to,
change, when the fifth signal is generated by changing the brightness of the first signal by multiplication with a prescribed multiple, the first color difference signal based on a ninth signal obtained by subtracting the fifth signal from a signal obtained by multiplying the second signal with the prescribed multiple, and change the second color difference signal based on a tenth signal obtained by subtracting the fifth signal from a signal obtained by multiplying the third signal with the prescribed multiple; and in the case in which the signal processing is to be performed on the first signal, the second signal, the third signal, and the fourth signal, the processing circuitry is configured to, generate, when the fifth signal is generated by changing the brightness of the first signal by multiplication with a prescribed multiple, an eleventh signal and a twelfth signal by multiplying, by the prescribed multiple, each of the first color difference signal and the second color different signal that are generated based on the second signal, the third signal, and the fourth signal.

4. The information processing apparatus according to claim 2, wherein in generating the fifth signal, the processing circuitry is configured to increase the brightness of the fifth signal as the brightness of the first signal decreases, and decrease the brightness of the fifth signal as the brightness of the first signal increases.

5. The information processing apparatus according to claim 4, wherein in generating the fifth signal, the processing circuitry is configured to execute, with double precision, operations in the process for increasing the brightness of the fifth signal as the brightness of the first signal decreases, and for decreasing the brightness of the fifth signal as the brightness of the first signal increases.

6. The information processing apparatus according to claim 4, wherein:

the brightness of the fifth signal is increased as the brightness of the first signal decreases and the brightness of the fifth signal is decreased as the brightness of the first signal increases by using a retinex method for changing an image by using retinex theory.

7. The information processing apparatus according to claim 1, wherein the processing circuitry is further configured to perform a contrast autofocus process by using an image in which the brightness has been corrected based on the generated second histogram.

8. The information processing apparatus according to claim 1, comprising:

wherein the processing circuitry is further configured to perform an HDR process based on an image in which the brightness has been corrected based on the generated second histogram.

9. The information processing apparatus according to claim 1, wherein the processing circuitry is configured to generate the second histogram in which the subtracted portion of the frequency of the area near the peak is distributed to the at least the area at which the frequency is relatively low.

10. The information processing apparatus according to claim 1, wherein the processing circuitry is configured to generate the second histogram in which the subtracted portion of the frequency of the area near the peak is distributed to the area at which the frequency is relatively low and the area near the peak.

11. The information processing apparatus according to claim 1, wherein the processing circuitry is configured to generate the second histogram in which the frequency of the at least the area at which the frequency is relatively low is increased equally using the subtracted portion of the frequency of the area near the peak.

12. The information processing apparatus according to claim 1, wherein the processing circuitry is configured to generate the second histogram in which the frequency of the at least the area at which the frequency is relatively low and the area near the peak are increased equally using the subtracted portion of the frequency of the area near the peak.

13. The information processing apparatus according to claim 1, wherein the processing circuitry is configured to subtract, from the first histogram, the portion of the frequency exceeding the adjustment amount of the area near the peak, and increase the frequency of the at least the area at which the frequency is relatively low using the subtracted portion of the frequency.

14. The information processing apparatus according to claim 1, wherein the adjustment amount indicates a value for adjusting a degree of flattening of the first histogram, and the processing circuitry is configured to generate the second histogram that is flattened by shifting the subtracted portion of the frequency of the area near the peak, which is acquired based on the adjustment amount, to the at least the area at which the frequency is relatively low.

15. The information processing apparatus according to claim 1, wherein the processing circuitry is configured to generate the second histogram in which the frequency of the at least the area at which the frequency is lower than the adjustment amount is increased, using the subtracted portion of the frequency of the area near the peak.

16. The information processing apparatus according to claim 1, wherein the processing circuitry is configured to generate the second histogram by performing a process of subtracting, based on the adjustment amount, the portion of the frequency of the area near the peak of the first histogram and increasing the frequency of the at least the area at which the frequency is relatively low, a plurality of times while changing the adjustment amount.

17. The information processing apparatus according to claim 1, wherein the processing circuitry is configured to generate multiple second histograms based on multiple first histograms of multiple divided images into which the single image is divided, before or after a process of generating the second histogram based on the first histogram of the signal image.

18. The information processing apparatus according to claim 1, wherein the processing circuitry is configured to generate multiple color difference signals, based on multiple color signals of the multiple pixels, a signal indicating a brightness of the first histogram, and changed signal indicating a brightness of the generated second histogram.

19. An information processing method comprising:

defining an entirety indicated by multiple pixels as a single image, and identifying a first histogram that is a histogram of brightness in the image;

setting an adjustment amount in the first histogram; and subtracting, from the first histogram, a portion of a frequency of an area near a peak of the first histogram, based on the adjustment amount, and increasing the frequency of at least an area of the first histogram at which the frequency is relatively low using the subtracted portion of the frequency of the area near the peak, to generate a second histogram.

20. A non-transitory computer-readable storage medium storing a program that causes a computer to execute processes, the processes comprising:

defining an entirety indicated by multiple pixels as a single image, and identifying a first histogram that is a histogram of brightness in the image;

setting an adjustment amount in the first histogram; and subtracting, from the first histogram, a portion of a frequency of an area near a peak of the first histogram, based on the adjustment amount, and increasing the frequency of at least an area of the first histogram at which the frequency is relatively low using the subtracted portion of the frequency of the area near the peak, thereby generating a second histogram.

\* \* \* \* \*